United States Patent Office 3,836,620
Patented Sept. 17, 1974

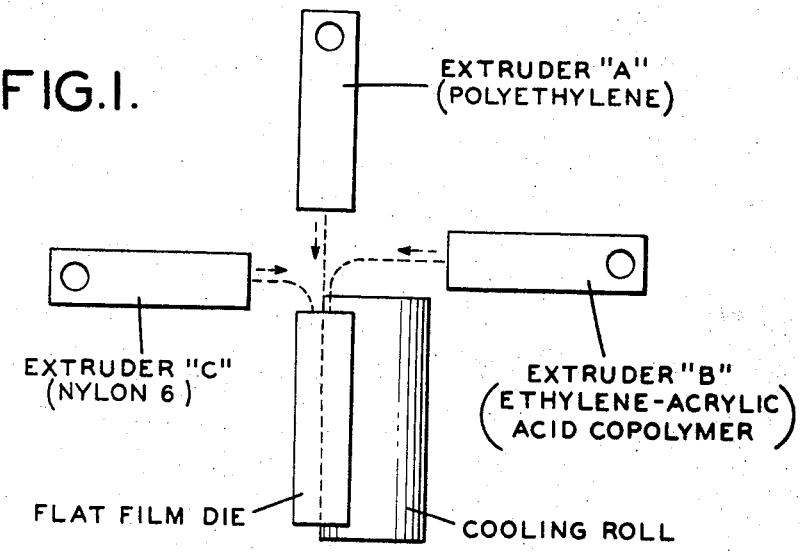
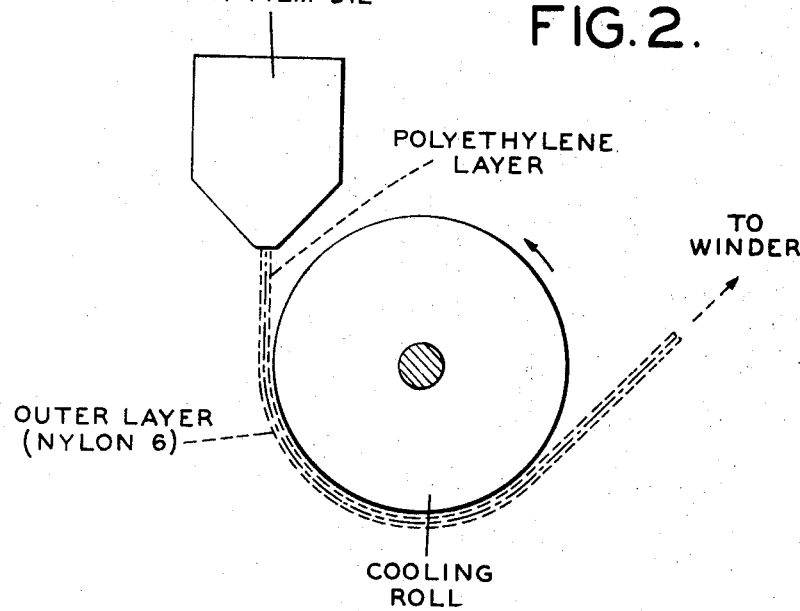

3,836,620
METHOD OF FORMING POLYAMIDE-POLY-ETHYLENE COMPOSITE FILMS
Mahendra Bhuta, Mendham, and William Sacks, Gillette, N.J., assignors to Allied Chemical Corporation, New York, N.Y.
Original application Feb. 26, 1971, Ser. No. 119,325, now Patent No. 3,697,368. Divided and this application June 27, 1972, Ser. No. 266,785
Int. Cl. B29f 3/08
U.S. Cl. 264—171
6 Claims

ABSTRACT OF THE DISCLOSURE

Composite films are provided by coextruding a polyamide with at least one combination of polymeric materials selected from the group of (1) (a) an ethylenic acidic polymer and (b) a polyolefinic hydrocarbon; or (2) a mixture of an ethylenic acidic polymer and a polyolefinic hydrocarbon or (3) (a) a mixture of an ethylenic acidic polymer and a polyolefinic hydrocarbon and (b) a polyolefinic hydrocarbon in a novel process which provides films having an excellent balance of properties including high strength, clarity and low moisture and gas permeability.

---

Figure 3:
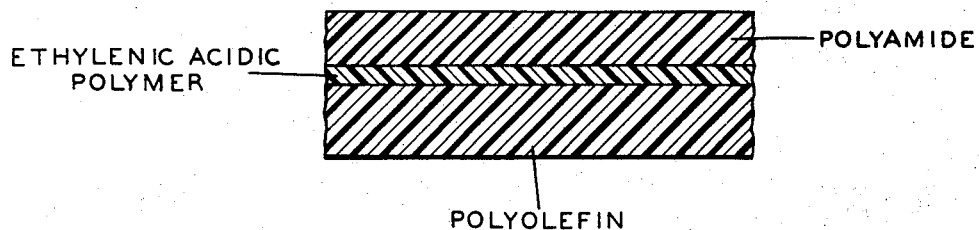

This is a division of application Ser. No. 119,325 filed Feb. 26, 1971, now U.S. Pat. 3,697,368.

POLYAMIDE-POLYETHYLENE COMPOSITE FILM

This application relates to novel composite films and to a process for the production thereof. More particularly, this invention relates to composite films comprising a polyamide having bonded to at least one of its surfaces a member selected from the group consisting of 1) an ethylenic acidic polymer adhesive layer which in turn has a polyolefinic hydrocarbon affixed to its outer surface; 2) a mixture layer consisting of an ethylenic acidic polymer and a polyolefinic hydrocarbon; and 3) a mixture layer consisting of an ethylenic acidic polymer and a polyolefinic hydrocarbon, said mixture layer in turn having a polyolefinic hydrocarbon affixed to its outer surface.

The desired properties for transparent packaging film are well known. They include high strength, heat-sealability, durability of the complete film and low permeability to moisture and gases, particularly oxygen and carbon dioxide. In addition to low gas permeability and those properties named above, such film should also desirably be easily thermoformable, of such a degree of transparency and gloss as to give an eye-appealing view of the item wrapped therein and the various layers comprising the film must not separate from each other. Moreover, where the package is subjected to extreme conditions, for example as a package for heat-in-the-bag foods, the film must possess high heat sealing characteristics as well as the ability to withstand extended exposure to elevated temperatures and high moisture environments.

It is possible to prepare nylon film having the advantageous properties of high strength, toughness and clarity. However, nylon has several drawbacks which make its utilization less than ideal. In addition to being relatively costly, it usually has a relatively high monomer content which presents processing problems since invariably the monomer tends to deposit during processing giving rise to stick marks, transfer of deposits to the film, etc. Additionally, for some applications, nylon films have had inadequate heat seal characteristics.

Similarly, polyolefins, for example, polyethylene film possess properties which contribute to their successful utilization in a wide variety of packaging applications. Such polyolefins, however, lack the requisites for certain applications because of limpness (lack of stiffness) and permeability to such gases as oxygen and carbon dioxide.

The industry has proposed various remedies to afford wider applicability of the above types of film which often tend to improve one property at the expense of others or which present other completely different problems. For example, it has been proposed to coat nylon film with polyethylene employing acidic polymers to improve the bonding of polyethylene to nylon which ordinarily will not adhere. While the bonding properties have been improved, preparation of these composites has still been less than satisfactory because of the tendency of nylon monomer to deposit or stick to processing equipment and because of the tackiness of the adhesive in the finished composite.

It is an object of this invention to provide an improved method for the production of polyamide-polyolefin composite films.

It is a further object of this invention to provide novel polyamide polyolefin composite film, utilizing the improved method of this invention, which are characterized by excellent strength, gloss, stiffness, clarity, low gas and moisture permeability and excellent heat seal properties.

These and other objects will be apparent from the description of the invention which follows.

In accordance with the present invention, composite film which possess an excellent balance of the requisite properties for packaging are provided. The composites comprise, broadly, a polyamide having bonded to at least one of its surfaces a member selected from the group consisting of (1) an ethylenic acidic polymer adhesive layer which in turn has a polyolefinic hydrocarbon affixed to its outer surface; (2) a mixture layer consisting of from about 70 to 95% of an ethylenic acidic polymer and from about 5 to 30% of a polyolefinic hydrocarbon; and (3) a mixture layer consisting of from about 70 to 95% of an ethylenic acidic polymer and from about 5 to 30% of a polyolefinic hydrocarbon, said mixture layer in turn having a polyolefinic hydrocarbon affixed to its outer surface.

The composite films of the invention are produced by a process which comprises simultaneously extruding melts of the desired polymers through a common flat film die employing two or alternatively three extruders, withdrawing the resultant melt extrudate from the die to contact a cooling means whereby said extrudate is drawn and cooled to form a composite film, said polymers having been positioned within said die so that as the extrudate exists the die, the polyamide is in contact with the atmosphere and the opposite outer polymer layer is in contact with said cooling means.

Referring to the drawings, FIG. 1 is a schematic arrangement of suitable apparatus employed to prepare the composite films of the invention. As illustrated, three extruders feed a common flat film die. Extruder A delivers polyolefinic hydrocarbon to the die, extruder B supplies molten adhesive for the middle layer and extruder C supplies the polyamide melt. Alternatively, depending on the particular film being produced, a premix of 70 to 95% ethylenic acidic polymer and 5 to 30% polyolefin is fed by Extruder A, Extruder B is omitted and Extruder C supplies the polyamide. In yet another alternate method, Extruder A supplies polyolefin, Extruder B supplies the mixture layer and Extruder C supplies the polyamide.

Depending upon the details of the internal flow channels of the die, either of four arrangements may be employed:

TYPE I.—PARALLEL CONTACTING FLOW AND END FEED

In this arrangement all of the melt streams enter the die at one end. The streams are then combined in a common manifold and exit through a common slit orifice.

TYPE II.—PARALLEL CONTACTING FLOW AND CENTER FEED

This arrangement is similar to Type I except that the malt streams enter the die in a central section.

TYPE III.—SEPARATED FLOW AND END FEED

In this arrangement, all of the streams enter the die at one end and flow through three separate channels which merge close to the final exit from the orifice slit.

TYPE IV.—SEPARATED FLOW AND CENTER FEED

This arrangement combines the features of Type II and III.

The particular arrangement is not critical and variations are listed for purposes of illustration only.

The extruded composite exiting the flat film die is contacted with cooling means, preferably a cooling roll which draws the melt to the desired ratio and delivers the cooled composite to a windup roll.

FIG. 2 is a schematic view of the melt exiting the die to contact the cooling roll.

Several critical conditions must be observed to achieve the objectives of this invention:

(1) The placement of the individual melt streams exiting the die with respect to the cooling roll (see FIG. 2) is an important feature of the process. It is essential that the polyolefin melt or mixture layer be positioned to contact the cooling roll and the polyamide be positioned to contact the atmosphere. This arrangement provides several advantages not otherwise obtained. Firstly, the polyolefin layer which has a relatively low freezing temperature compared to the polyamide is thus rapidly cooled to impart a higher degree of transparency and gloss to the composite surface. Secondly, contact of the polyamide melt with the cooling roll is avoided accomplishing a twofold benefit, namely elimination of monomer deposition (thereby eliminating the problem of stick marks, transfer of deposits to the film, etc.) and achievement of more rapid crystallization of the polyamide layer by reducing the rate of cooling of this layer. More rapid crystallization of the polyamide conveys improved properties to this component, e.g. both stiffness and strength are increased. The arrangement additionally permits further treatment of the polyamide layer concurrently with the cooling of the polyolefins or mixture layer. In a preferred embodiment herein, while the polyolefin layer is in contact with the cooling roll, the polyamide layer is directly exposed to steam or other high relative humidity atmosphere to induce some moisture pick-up which further promotes more rapid crystallization and, thus, higher stiffness and strength to the polyamide layer.

(2) A second critical consideration is the selection of the polymer components of the laminate composite to provide uniform flow distribution across the composite web. The polymer components should have a melt index (a measure of viscosity described in detail in ASTM–D–1238) within the range of 5 to 30 decigrams per minute at temperatures within the range of about 240° C. to about 280° C.

Figure 5:
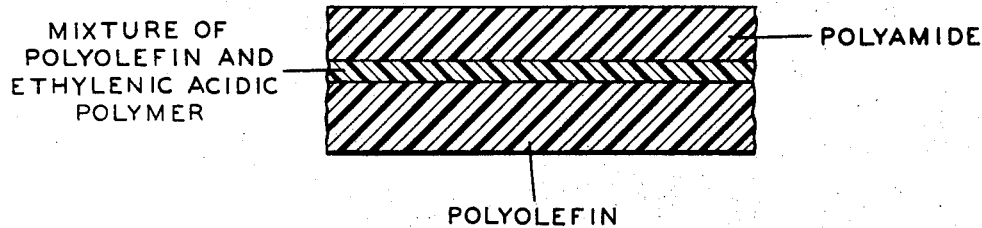
Figure 4:
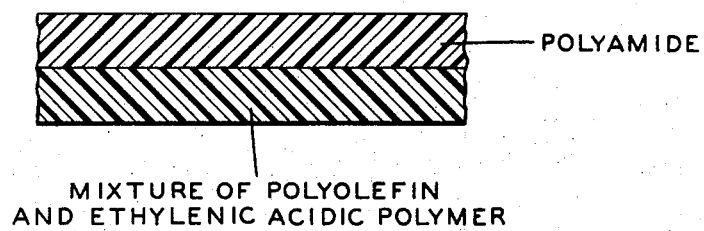

Films produced by the invention are illustratively shown in FIGS. 3 to 5.

In FIG. 3, the composite comprises a polyamide bonded to an ethylenic acidic polymer layer which in turn has a polyolefinic hydrocarbon affixed to its surface. The product, due to treatment of the polyamide layer by the process of this invention, is a high clarity film with strong interlayer bonding.

In one specific embodiment, illustrated in FIG. 4, the composite comprises a polyamide bonded to a mixture layer composed of a mixture of about 70 to 95%, preferably 80 to 90% ethylenic acidic polymer and about 5 to 30%, preferably 10 to 20% of a polyolefinic hydrocarbon.

A second specific embodiment of the invention is illustrated in FIG. 5. The composite comprises a polyamide bonded to a mixture layer composed of a mixture of about 70 to 95% ethylenic acidic polymer and about 5 to 30% of a polyolefinic hydrocarbon which in turn has a polyolefinic hydrocarbon affixed to its outer surface.

These are particularly preferred products offering practical processing advantages over composites where the mixture layer is not employed. For example, when ethylenic acidic polymers per se are employed as the adhesive layer, the surfaces of the adhesive layer in the finished composite tend to tack or block at relatively low temperature, stick to the wind-up roll, etc. We have made the discovery that the problem of tackiness and blocking is overcome when such ethylenic acidic polymers are admixed with polyolefin as a mixture layer. The admixture is accomplished simply by mechanically mixing the various components of the mixture and completing the mixing during the extrusion step. The products have good interlayer adhesion as well as good optical properties without tackiness and/or blocking.

The polyamide component used in the practice of this invention may be any of well known film-forming polyamides. Such polymers must have a melt index within the range of 5 to 30 decigrams per minute at temperatures within the range of about 240° C. to 280° C. and include Nylon 6 (polycaproamide); nylon 6,6 (polyhexamethylene adipamide), nylon 6,10; nylon 10; nylon 11 (poly-11-undecanoamide); and nylon 12 (poly-12-dodecanoamide). The preferred polyamides are nylon 6 and nylon 6,6.

The ethylenic acidic polymers employed as melt adhesives or in admixture with polyolefins herein are likewise well known in this art. Suitable ethylenic acidic polymers include:

ethylene-acrylic acid copolymers
ethylene-ethyl acrylate-acrylic acid terpolymers
ethylene-methacrylic acid copolymers
ethylene-methacrylic acid-metal methacrylate interpolymers (ionomers)
ethylene-acrylic acid-metal acrylate interpolymers (isonomers)

These acidic polymers must exhibit melt indices, discussed above, of 5 to 30 decigrams per minute at 240° C. to 280° C. Additionally, the olefin content of the polymer is preferably at least 50 mol percent and the acidic monomers content from about 5 to 25 mol percent of the polymer. In the case where metallized interpolymers are employed, the metal is a mono-, di- or trivalent metal of Groups I, II, III, IVA and VIII of the Periodic Table of Elements (see p. 392, Handbook of Chemistry and Physics, Chemical Rubber Publishing Co., 37th Edition). Polymers wherein the metals are of Groups I and II and especially $NA^+$, $K^+$ and $Zn^{++}$ are preferred. It will be appreciated by those skilled in the art that where the composite film is to be utilized in the packaging of foods, the metal selected should be non-toxic.

The ethylenic acidic polymers may be prepared by methods well known in the art including those disclosed in U.S. Pats. 3,355,319, 3,264,272 etc. wherein the copolymers are obtained by the copolymerization of a mixture of the olefin and the carboxylic acid monomer. It is preferred that the acidic polymers employed herein have a high polyarity as indicated by wetting measurements, i.e. they should be capable of being wet by inert solvents having surface tensions of 37 dynes per centimeter or greater.

The preferred polymers herein are ethylene-acrylic acid copolymer containing at least 50 mol percent ethylene and ethylene-methacrylic acid-metal methacrylates, which contains at least 50 mol percent ethylene and wherein the metal is preferably, Na, K or Zn.

The term "polyolefin hydrocarbon" is used in the present specification and claims to denote normally solid polymers of alpha olefins, compounds of the formula $$R\text{---}CH=CH_2$$

wherein R is hydrogen or an alkyl group, particularly an alkyl group containing 1 to 8 carbon atoms, and include polyethylene, polypropylene, ethylene-propylene copolymer, ethylene-butene-1 copolymer, etc. The polyolefins employed must also exhibit melt indices within the range of 5 to 30 decigrams per minute at 240° to 280° C. The preferred polyolefin of this invention is polyethylene which may be of low, medium or high density. Especially preferred are polyethylenes having densities within the range of 0.92 to 0.935.

The length and width of the films of this invention are dictated by the intended usage and the films may range from narrow tapes to wide sheeting.

Thicknesses of the various layers as well as of the composite may also vary as desired. The films may be of 0.85 to 110 mils preferably 1 to 5 mils in thickness. The polyamide layer may range from about 0.25 mils to 50 mils thick, preferably 0.75 to 2 mils in thickness; the ethylenic acidic polymer layer or mixture layer can be from about 0.1 mil to 10 mils, preferably 0.25 to 1.5 mil in thickness; and the polyolefin layer can range from about 0.5 mils to 50 mils thick, preferably 1.0 to 5 mils in thickness.

Processing conditions employed in the extruders, flat film die and cooling roll are also subject to variation. Extruder temperatures for the various components are preferably as follows:

Extruder A—Polyamide
Temperature—430° to 575° F., preferably 460° to 500° F.
Extruder B—Ethylenic Acidic Poly and/or Mixture Layer
Temperature—300° to 500° F., preferably 400° to 460° F.
Extruder C—Polyolefin
Temperature—350° to 500° F., preferably 400° to 460° F.
Coextrusion Die Temperature—450° to 575° F., preferably 500° to 525° F.
Cooling Roll Temperature—40° F. to 200° F., preferably 100° to 150° F.

To illustrate the practice and advantages of this invention, typical films were prepared and measurements made of their pertinent characteristics. More particularly, the objects of this invention were accomplished by simultaneously extruding two or more polymeric materials selected from the group of (1)(a) a polyamide, (b) an ethylenic acidic polymer and (c) a polyolefinic hydrocarbon, (2)(a) a polyamide and (b) a mixture consisting of about 70 to 95% ethylenic acidic polymer and about 5 to 30% of a polyolefinic hydrocarbon or (3)(a) a polyamide, (b) a mixture consisting of about 70 to 95% ethylenic acidic polymer and about 5 to 30% of a polyolefinic hydrocarbon and (c) a polyolefinic hydrocarbon into a common flat film die and discharging the melt streams exiting the die to contact a cooling means, said melt streams being positioned so that said polyamide is in contact with the atmosphere, and, optionally, contacting said polyamide layer with steam to induce rapid crystallization.

Example I

A three layer composite film having a total thickness of 2 mils was prepared employing the equipment outlined in FIG. 1.

Extruder A—feeds 0.93 density polyethylene melt having a melt index of about 6.5 at 240° F. The extruder barrel (2½ inch in diameter) had a temperature in the range of 360° to 495° F. and operated at a screw speed of 18.5 r.p.m.

Extruder B—feeds ethylene-methacrylic acid-sodium methacrylate having a melt index of 11.6 at 240° F. The extruder barrel (¾ inch in diameter) was operated at 350° to 450° F. and a screw speed of 110 r.p.m.

Extruder C—feeds nylon 6 melt. The extruder barrel (1 inch in diameter) was operated at 430° to 490° F. and a screw speed of 125 r.p.m.

The three melt streams were passed to one end of the coextrusion die, operated at 500° to 525° F. and having a 24 inch length exit slit orifice, where they were combined in a common manifold and exit the die through the common slit orifice. Upon exiting the die, the composite, tri-layer melt was passed over a cooling roll consisting of an 18-inch diameter, chrome plated roll maintained at a temperature of 100° F. and rotating at a surface speed of 50 feet per minute. The cooled and drawn composite film was then passed to wind-up.

Employing the procedure and equipment outlined above, the following composites were also prepared:

(A) Nylon 6/ethylene methacrylic/polyethylene acid-sodium methacrylate
Thickness: 1.5 mils/0.5 mil/2 mils
Total Thickness: 4 mils
(B) Nyon 6/ethylene methacrylic/polyethylene acid-sodium methacrylate
Thicknesses: 0.75 mil/0.25 mil/1.0 mil
Total Thickness: 2.0 mils The products (A) and (B) were glossy, transparent film having excellent interlayer adhesion and, when sealed at 375° F., 20 p.s.i., had seal strengths (breaking strengths) of 10.7 lb./in. and 4 lbs./in. respectively in peel.

The products also exhibited the following properties:

Tensile Modulus, p.s.i.—50,000 to 65,000
Tensile Strength, p.s.i.—6,000 to 8,500
Oxygen Transmission—1.1 to 2.4 (cc./100 in.²/24 hrs.)
Moisture Transmission—0.34 to 0.51 (g./100 in.²/24 hrs.)

When a mixture layer as disclosed supra is employed instead of the ethylenic acidic polymer employed in the above example, comparable films having comparable properties are obtained.

Example II

A two-layer composite film having a total thickness of 2 mils was employed using the procedure of Example I except that two extruders were employed instead of three.

Extruder A feeds a mixture layer comprising 80% ethylene-methacrylic acid-sodium methacrylate having a melt index of 11.6 at 240° F. and 20% 0.93 density polyethylene. The extruder barrel (2½ inch in diameter) had a temperature 360° to 390° F. and operated at a screw speed of 18.5 r.p.m.

Extruder B feeds nylon 6 melt. The barrel (1 inch) temperature was 435° F. to 495° F. and operated at a scew speed of 115 r.p.m.

The melts were co-extruded drawn and cooled employing the same equipment and conditions as in Example I after which the composite film was passed to wind-up.

The following composites were prepared:

(A) Nylon 6/Mixture of 80% ethylene-methacrylic acid-sodium methacrylate and 20% 0.93 polyethylene
Thicknesses: 1 mil/1 mil
(B) Nylon 6/Mixture of 90% ethylene-methacrylic acid-sodium methacrylate and 10% 0.93 polyethylene
Thicknesses: 1 mil/1 mil (C) Nylon 6/100% ethylene-methacrylic acid-sodium methacrylate (Comparative)
Thicknesses: 1 mil/1 mil The composites had the following properties:

TABLE I

|  | Film A | Film B | Film C |
| --- | --- | --- | --- |
| Seal strength (375° F., 20 p.s.i.), lbs./in. | 5.5 | 6.8 | 4.3 |
| Modulus, p.s.i.: |  |  |  |
| MD | 43,000 | 39,000 | 41,000 |
| TD | 59,000 | 53,000 | 41,000 |
| Tensile strength, p.s.i.: |  |  |  |
| MD | 8,900 | 9,800 | 10,100 |
| TD | 9,700 | 8,100 | 9,700 |
| Haze, percent | 7.0 | 10.0 | 1.2 |
| Gloss, 45° | 75 | 72 | 90 |
| Interlayer adhesion | Good | Good | Good |
| Tackiness | No | No | Yes |

In the above Table and in Example I, Tensile Strength and Modulus were obtained per ASTM-D882-62T, Method A, percent Haze per ASTM-D1003-61, Procedure A and Gloss was measured by the use of a Gardner Glossometer at a 20° angle. The value indicates the reflectance of the film. Transmission rates were determined by mounting the film sample in a volumetric gas transmission cell as described in U.S. Pat. 3,514,367. Adhesion was determined by making a heat seal (scoring the sample through the film) and attempting to peel or break at the nylon-mixture layer or ethylenic acidic polymer interface. Good adhesion indicates there was no break or peel at the interface.

In Table I, comparative Example C, where an ethylenic acidic polymer was employed instead of the mixture layer, the resultant film, most significantly, was tacky with respect to the ethylenic polymer surface. This led to difficulties during processing since the tacky surface tended to stick to the rolls leading into wind-up.

It can be seen from the above examples that composite films having the requisite properties for transparent packaging have been prepared and such films exhibit improved properties over similar prior art films due to the unique processing technique disclosed herein.

We claim:

1. A method for the preparation of composite films which comprises the steps of
   (A) coextruding a polycaproamide with at least one combination of polymeric materials selected from the group of (1)(a) an ethylenic acidic polymer and (b) a polyolefinic hydrocarbon; (2) a mixture consisting of about 70% to 95% ethylenic acidic polymer and about 5% to 30% polyolefinic hydrocarbon; and (3)(a) a mixture consisting of about 70% to 95% ethylenic acidic polymer and about 5% to 30% polyolefinic hydrocarbon and (b) a polyolefinic hydrocarbon into a common flat film die, each of said polymer components having a melt index within the range of 5 to 30 decigrams per minute at temperatures within the range of about 240° C. to about 280° C., and
   (B) discharging the extrudates exiting the die to contact a cooling roll whereby said extrudates are drawn and cooled to form a composite film, said extrudates being positioned so that said polyamide is in contact with the atmosphere and said polyolefin or said mixture is in contact with said cooling roll, whereby said polyolefin or said mixture is rapidly cooled to impart a high degree of transparency and gloss to its surface and the rate of cooling of said polycaproamide is reduced to achieve a more rapid rate of crystallization and increased stiffness and strength of said polycaproamide by avoiding contact of said polycaproamide with said cooling roll.

2. A method as claimed in Claim 1 wherein said polymeric materials are (1) a polycaproamide, (2) an ethylenic acidic polymer and (3) a polyolefinic hydrocarbon.

3. A method as claimed in Claim 1 wherein said polymeric materials are (1) a polycaproamide, (2) a mixture of a polyolefinic hydrocarbon and an ethylenic acidic polymer and (3) a polyolefinic hydrocarbon.

4. A method as claimed in Claim 1 wherein said polymeric materials are (1) a polycaproamide and (2) a mixture of a polyolefinic hydrocarbon and an ethylenic acidic polymer.

5. A method as claimed in Claim 1 wherein said ethylenic acidic polymer is ethylene-methacrylic acid-metal methacrylate ionomer and said polyolefinic hydrocarbon is polyethylene.

6. A method as claimed in Claim 5 wherein said polycaproamide, concurrently with contact of said polyolefin or said mixture layer with said cooling means, is contacted with a high relative humidity atmosphere.

References Cited

UNITED STATES PATENTS

| 3,464,087 | 9/1969 | Koch | 425—131 |
| 3,361,728 | 1/1968 | Coen et al. | 264—216 |
| 3,560,227 | 2/1971 | Eichhorn et al. | 161—165 |
| 3,355,319 | 11/1967 | Rees | 117—138.8 N |
| 3,397,263 | 8/1968 | Werner | 264—215 |
| 3,264,272 | 8/1966 | Rees | 161—216 |
| 3,524,795 | 8/1970 | Peterson | 425—131 |
| 3,570,748 | 3/1971 | Coyle et al. | 264—346 |

ROBERT F. WHITE, Primary Examiner

G. AUVILLE, Assistant Examiner

U.S. Cl. X.R.

156—244; 264—216